United States Patent
Lee et al.

(10) Patent No.: US 9,961,394 B2
(45) Date of Patent: May 1, 2018

(54) DISPLAY APPARATUS, CONTROLLING METHOD THEREOF, AND DISPLAY SYSTEM

(71) Applicant: SAMSUNG ELECTRONICS CO., LTD., Suwon-si (KR)

(72) Inventors: Sang-wook Lee, Seoul (KR); Chang-won Kim, Gwangju-si (KR); Young-chun Ahn, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 296 days.

(21) Appl. No.: 14/507,119

(22) Filed: Oct. 6, 2014

(65) Prior Publication Data
US 2015/0281765 A1   Oct. 1, 2015

(30) Foreign Application Priority Data
Mar. 26, 2014   (KR) .................. 10-2014-0035567

(51) Int. Cl.
*H04N 21/431*     (2011.01)
*H04N 21/81*      (2011.01)

(52) U.S. Cl.
CPC ..... *H04N 21/4316* (2013.01); *H04N 21/8133* (2013.01)

(58) Field of Classification Search
CPC ....... H04N 21/26603; H04N 21/41407; H04N 21/4316; H04N 21/435; H04N 21/6547; H04N 21/8126; H04N 21/8133; H04N 21/83
See application file for complete search history.

(56) References Cited

U.S. PATENT DOCUMENTS

| | | | | |
|---|---|---|---|---|
| 8,281,339 | B1* | 10/2012 | Walker | G06Q 10/00 348/564 |
| 2006/0288373 | A1* | 12/2006 | Grimes | G06F 3/14 725/62 |
| 2008/0244637 | A1* | 10/2008 | Candelore | H04N 7/163 725/28 |
| 2009/0009532 | A1* | 1/2009 | Hallberg | G06K 9/325 345/636 |
| 2012/0117584 | A1* | 5/2012 | Gordon | H04N 21/254 725/19 |
| 2015/0020094 | A1* | 1/2015 | Moon | H04N 21/478 725/32 |
| 2015/0054967 | A1* | 2/2015 | Nagaike | H04N 1/00129 348/207.1 |

* cited by examiner

*Primary Examiner* — Benjamin R Bruckart
*Assistant Examiner* — Jen-Shi Huang
(74) *Attorney, Agent, or Firm* — Sughrue Mion, PLLC

(57) ABSTRACT

A display apparatus includes a receiver configured to receive an image, a display configured to display the image, a communicator configured to perform communication with an external server and receive On-Screen Display (OSD) configuration information, and a controller configured to, when an OSD event occurs, extract an OSD configuration element from the displayed image, determines whether the extracted OSD configuration element matches the received OSD configuration information, and in response to determining that the extracted OSD configuration element matches the received OSD configuration information, obtain information regarding the displayed image from the extracted OSD configuration element.

15 Claims, 8 Drawing Sheets

(a)

(b)

(c)

11 ~521
ABC ~522

(d)

(a)

(b)

1:0 ~541
aa vs bb ~542

(c)

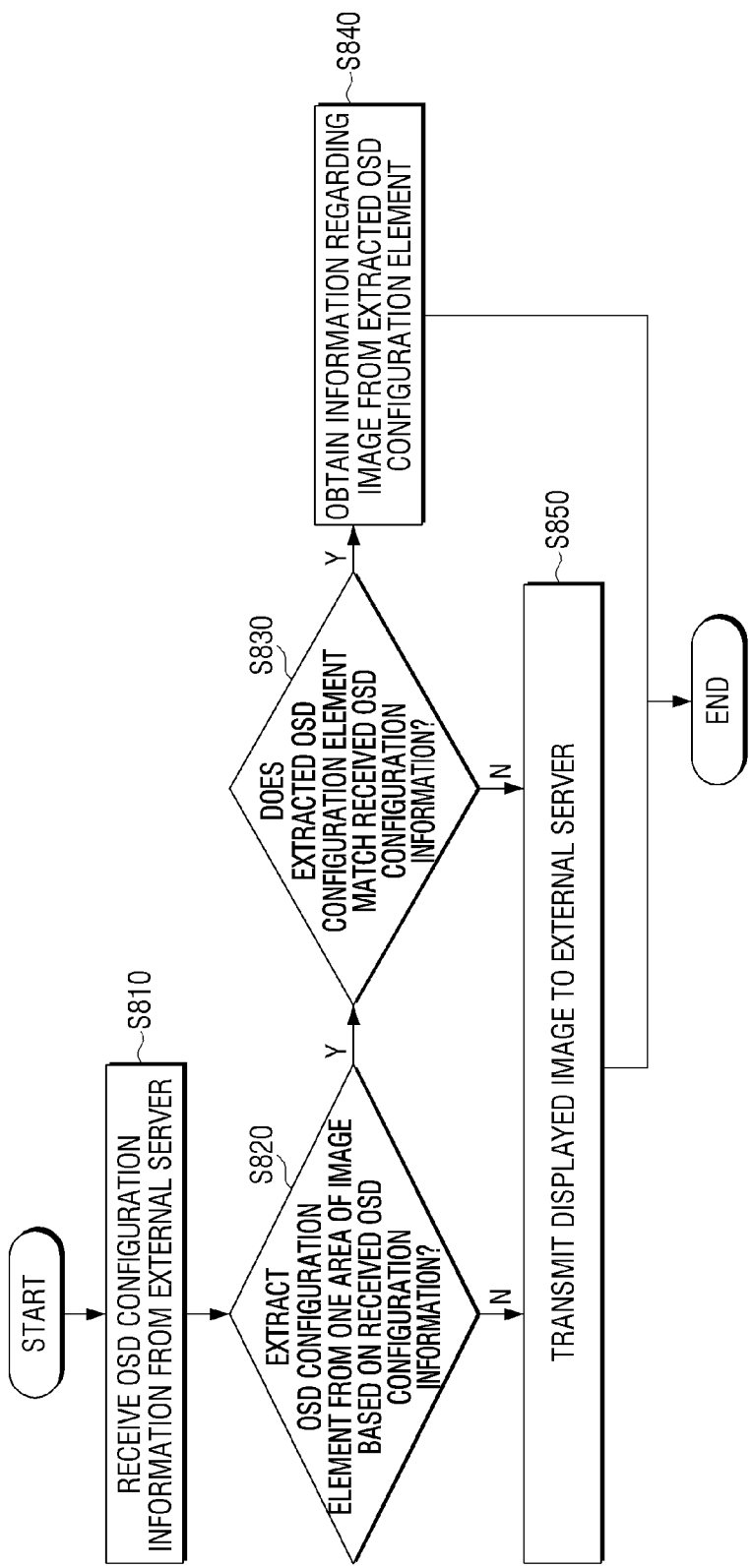

DISPLAY APPARATUS, CONTROLLING METHOD THEREOF, AND DISPLAY SYSTEM

CROSS-REFERENCE TO RELATED APPLICATIONS

This application claims priority from Korean Patent Application No. 10-2014-0035567, filed in the Korean Intellectual Property Office on Mar. 26, 2014, the disclosure of which is incorporated herein by reference.

BACKGROUND

1. Field

Methods and apparatuses consistent with the exemplary embodiments relate to obtaining information regarding an image from an On-Screen Display (OSD) element.

2. Description of the Related Art

With the development of display technologies, various types of display apparatuses have been developed that provide various functions to meet user's needs. Accordingly, a user may watch various types of content through various types of display apparatuses, including a television.

In particular, a user may watch various types of content provided not only by terrestrial broadcasting, but also by cable broadcasting and satellite broadcasting. This can be done using an external apparatus such as a set-top box and a satellite receiving apparatus.

However, if a display apparatus displays a broadcast content through an external apparatus, the display apparatus merely receives and displays a broadcasting signal processed by the external apparatus and thus, it is difficult to obtain information regarding the content displayed currently on the display apparatus.

In addition to a video signal and a voice signal, the broadcasting signal also includes additional information regarding the broadcast content. For example, if a television receives a broadcasting signal through a set-top box, the broadcasting signal that the set-top box receives is processed in the set-top box and transmitted to the television. The television simply receives the signal and displays it.

If a user switches a channel while watching a television, even if a set-top box adds information regarding the switched channel in a content in the form of OSD and transmits the information to the television using additional information, a viewer who is watching the television may watch the information, but it is not possible for the television to tell whether the OSD information displayed on the screen is information regarding the broadcast content or part of the broadcast content.

Therefore, when a display apparatus receives and displays a content through an external apparatus such as a set-top box and a satellite receiving apparatus, a method which allows the display apparatus to obtain information regarding the currently-displayed content is required.

SUMMARY

An aspect of the exemplary embodiments relates to a display capable of obtaining information regarding content even if the content is provided to the display apparatus through an external apparatus such as a set-top box.

According to an aspect of an exemplary embodiment, a display apparatus includes a receiver configured to receive an image, a display configured to display the image, a communicator configured to communicate with an external server and receive OSD configuration information, and a controller configured to, when an OSD event occurs, extract an OSD configuration element from the displayed image, determines whether the extracted OSD configuration element matches the received OSD configuration information, and in response to determining that the extracted OSD configuration element matches the received OSD configuration information, obtain information regarding the displayed image from the extracted OSD configuration element.

The OSD configuration information may include at least one of location information, color information, brightness information, size information, and spacing information of the OSD configuration element, and the OSD configuration element may include at least one of a channel number, a broadcast station name, a content title, and a current time.

The controller may be configured to, when an OSD event occurs, capture the displayed image for a predetermined time, and extract the OSD configuration element from one area of the captured image based on the received OSD configuration information.

The controller may be configured to, when there are a plurality of OSD configuration elements in the displayed image, determine whether the plurality of OSD configuration elements match the received OSD configuration information.

The controller may be configured to, when it is determined that the OSD configuration element does not exist in one area of the displayed image which is set based on the received OSD configuration information, or the extracted OSD configuration element does not match the received OSD configuration information, control the communicator to transmit the displayed image to the external server.

The OSD configuration information may correspond to a broadcast receiving apparatus which provides an image displayed on the display apparatus.

The controller may be configured to recognize the extracted OSD configuration element as a letter, calculate recognition reliability, and in response to the calculated recognition reliability being less than a predetermined threshold value, determine that the extracted OSD configuration element does not match the received OSD configuration information.

According to an aspect of an exemplary embodiment, a method of controlling a display apparatus includes receiving OSD configuration information from an external server, when an OSD event occurs, extracting an OSD configuration element from the displayed image, and determining whether the extracted OSD configuration element with the received OSD configuration information, and in response to determining that the extracted OSD configuration element matches the received OSD configuration information, obtaining information regarding the displayed image from the extracted OSD configuration element.

The OSD configuration information may include at least one of location information, color information, brightness information, size information, and spacing information of the OSD configuration element, and the OSD configuration element may include at least one of a channel number, a broadcast station name, a content title, and a current time.

The determining may include, when an OSD event occurs, capturing the displayed image for a predetermined time, and extracting the OSD configuration element from one area of the captured image based on the received OSD configuration information, and determining whether the extracted OSD configuration element matches the received OSD configuration information.

The determining may include, when there are a plurality of OSD configuration elements in the displayed image, determining whether the plurality of OSD configuration elements match the received OSD configuration information.

The method may further include, when it is determined that the OSD configuration element does not exist in one area of the displayed image which is set based on the received OSD configuration information, or the extracted OSD configuration element does not match the received OSD configuration information, transmitting the displayed image to the external server.

The OSD configuration information may correspond to a broadcast receiving apparatus which provides an image displayed on the display apparatus.

The determining may include recognizing the extracted OSD configuration element as a character and calculating recognition reliability, and in response to the calculated recognition reliability being less than a predetermined threshold value, it may be determined that the extracted OSD configuration element does not match the received OSD configuration information.

A display system according to an exemplary embodiment includes a broadcast receiving apparatus transmitting an image and an OSD including at least one of a channel number, a broadcast station name, and a content title to a display apparatus, an external server configured to transmit OSD configuration information for a broadcast receiving apparatus, and in response to an image being received from the display apparatus, update the OSD configuration information using the received image, and a display apparatus configured to, when an OSD event occurs, extract an OSD configuration element from a displayed image, determine whether the extracted OSD configuration element matches the received OSD configuration information, in response to determining that the extracted OSD configuration element matches the received OSD configuration information, obtain information regarding the displayed image from the extracted OSD configuration element, and in response to determining that the extracted OSD configuration element does not match the received OSD configuration information, transmit the displayed image to the external server.

According to an aspect of an exemplary embodiment, an On-Screen Display (OSD) configuring display apparatus includes a communicator configured to communicate with an external server and receive On-Screen Display (OSD) configuration information, and a controller configured to extract an OSD configuration element from the displayed image when an OSD event occurs, compare the OSD configuration element to the OSD configuration information to determine if they match; and transmit the displayed image to the external server or obtain information regarding the displayed image.

The OSD configuring display apparatus may be configured to obtain the information regarding the displayed image from the OSD configuration element if the OSD configuration element matches the OSD configuration information, and the controller may be configured to transmit the displayed image to the external server if the OSD configuration element does not match the OSD configuration information.

The OSD configuring display apparatus may include extracting the OSD configuration element from the displayed image which may include determining an area where an OSD is displayed based on OSD location information received from the external server and extracting the OSD configuration element from the determined area.

The controller may be configured to recognize when the OSD configuration element is a character and may calculate a recognition reliability, and in response to the recognition reliability being less than a predetermined threshold value, determine that the OSD configuration element does not match the received OSD configuration information.

According to the above-described various exemplary embodiments, even if a content is received and displayed through an external apparatus such as a set-top box, a display apparatus may obtain information regarding the displayed content and provide various services using the obtained information.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 8 is a flowchart provided to explain a method of controlling a display apparatus according to another exemplary embodiment.

DETAILED DESCRIPTION

Figure 1:
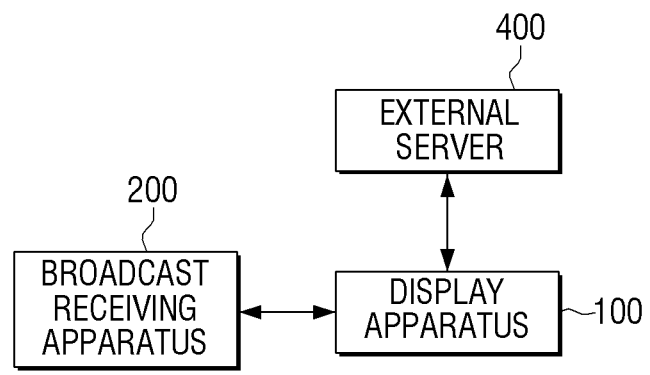
FIG. 1 is a block diagram illustrating a configuration of a display system according to an exemplary embodiment.

Hereinafter, an aspect of an exemplary embodiment will be described in detail with reference to accompanying drawings. In the following description, same reference numerals are used for analogous elements when they are depicted in different drawings. The matters defined in the description, such as detailed construction and elements, are provided to assist in a comprehensive understanding of exemplary embodiments. However, exemplary embodiments can be carried out without those specifically defined matters. Also, functions or elements known in the related art are not described in detail since they would obscure the exemplary embodiments with unnecessary detail.

In the present disclosure, relational terms such as first, second, and other similar terms, may be used to distinguish one entity from another entity, without necessarily implying any actual relationship or order between such entities.

FIG. 1 is a block diagram illustrating a display system according to an exemplary embodiment. As shown in FIG. 1, display system 10 may include a display apparatus 100, a broadcast receiving apparatus 200, and an external server 400.

The broadcast receiving apparatus 200 may receive a broadcasting signal and transmit the broadcasting signal to the display apparatus 100. Herein, the broadcasting signal may include a video signal and an audio signal which constitute content, and additional data.

Specifically, if a broadcasting signal is received, the broadcast receiving apparatus 200 processes an image and a voice included in the broadcasting signal to be in a form which can be displayed on the display apparatus 100, and may process additional data included in the broadcasting signal and add the additional data in the form of OSD and transmit the data to the display apparatus 100.

For example, if the broadcast receiving apparatus 200 is a set-top box, the set-top box may receive a broadcasting signal via cable, process the received broadcasting signal, and transmit the signal to the display apparatus 100 such as a television. If a user switches a channel while watching one broadcast channel, a set-top box may add information regarding the switched channel, such as a channel number, a broadcast station name, and a broadcast content title in the corresponding broadcast content image in the form of OSD, and transmit the image to a television.

In this case, the broadcast receiving apparatus 200 adds an OSD in an image according to OSD configuration information regarding elements which constitute the OSD. The OSD configuration information varies depending on broadcast receiving apparatuses. That is, even if the received additional data is the same, the configuration or shape of the OSD which is added to an image may differ depending on the broadcast receiving apparatus 200.

However, OSD configuration information for the broadcast receiving apparatus 200 is not necessarily provided directly from the broadcast receiving apparatus 200 to the display apparatus 100. The OSD configuration information may be provided to the display apparatus 100 through an external server 200 as described below.

Herein, the OSD configuration information refers to information regarding OSD configuration elements such as a channel, a broadcast station name, a content title, information regarding the location, color, brightness, size, spacing of the OSD configuration elements in the display apparatus 100. The OSD configuration information may vary depending on broadcast receiving apparatuses.

The broadcast receiving apparatus 200 adds the OSD in the image according to the OSD configuration information, which may vary according to the broadcast receiving apparatus. The external server 400 receives and stores the OSD configuration information for each broadcasting receiving apparatus and may transmit OSD configuration information for the broadcast receiving apparatus 200 to the display apparatus 100.

For example, if the broadcast receiving apparatus 200 is a set-top box, an external server operator may receive OSD configuration information for each set-top box model from set-top box manufacturers, store the information in the external server 400, and provide the information to the display apparatus 100.

Meanwhile, if an image is received from the display apparatus 100, the external server 400 may update the OSD configuration information using the received image.

The display apparatus 100 may transmit a display image to the external server 400 when the OSD configuration element extracted from the displayed image does not match the OSD configuration information received from the external server 400. The external server 400 may extract an OSD configuration element from the image received from the display apparatus 100, obtain OSD configuration from the extracted OSD configuration element, and update pre-stored OSD configuration information based on the obtained OSD configuration information. The updated OSD configuration information may be transmitted to the display apparatus 100 using the received image.

Accordingly, even if a user replaces the broadcast receiving apparatus 200 connected to the display apparatus 100, the external server 400 may obtain OSD configuration information of the replaced broadcast receiving apparatus 200. Thus, the OSD configuration information which is transmitted from the external server 400 to the display apparatus 100 may be updated to correspond to the broadcast receiving apparatus currently connected to the display apparatus 100.

In the above exemplary embodiment, the external server 400 extracts OSD configuration information from the received image and updates the OSD configuration information, but the method of updating OSD configuration information using the image received from the display apparatus 100 is not limited thereto.

The display apparatus 100 may receive and display an image where an OSD is added from the broadcast receiving apparatus 200. The display apparatus 100 may be realized as a television, however, this is only one example. The display apparatus 100 may be realized as other display apparatuses such as a smart phone, a tablet PC, and a notebook PC. However, these are only examples. Other apparatuses may also be used.

In addition, the display apparatus 100 may receive OSD configuration information from the external server 400 and store the received OSD configuration information.

The display apparatus 100 may also determine whether an OSD event occurs. The OSD event may include an event of switching channels according to a user manipulation while an image is displayed, an event of switching channels when a scheduled time arrives, and an event of turning on/off the display apparatus 100. However, the OSD event is not limited to these examples.

If it is determined that an OSD event occurs, the display apparatus 100 may extract an OSD configuration element from a displayed image and determine whether the extracted OSD configuration element matches the OSD configuration information received from the external server 400. If it is determined that the extracted OSD configuration element matches the OSD configuration information received from the external server 400 then the display apparatus 100 may obtain information regarding the displayed image from the extracted OSD configuration element. If it is determined that the extracted OSD configuration element does not match the OSD configuration information received from the external server 400 then the display apparatus 100 may transmit the displayed image to the external server 400.

The display apparatus 100 may capture an image displayed for a predetermined time, extract an OSD configuration element from one area of the captured image based on the OSD configuration information received from the external server 400, and determine whether the extracted OSD configuration element matches the received OSD configuration information.

If there are a plurality of OSD configuration elements in a displayed image, the display apparatus 100 may determine whether the plurality of extracted OSD configuration elements matches the OSD configuration information received from the server 400.

If it is determined that the extracted OSD configuration element or the plurality of extracted OSD configuration elements matches the OSD configuration information received from the external server 400, the display apparatus 100 may obtain information regarding the displayed image from the extracted OSD configuration element. In this case, the information regarding the displayed image may include information regarding a channel number, a broadcast station, a content title, etc.

Meanwhile, if it is determined that the extracted OSD configuration element or the plurality of extracted OSD configuration elements does not match the OSD configuration information received from the external server 400, the display apparatus 100 may transmit the displayed image to the external server 400. The external server 400 may update pre-stored OSD configuration information based on the displayed image.

Accordingly, even in the case where a content is received and displayed through the broadcast receiving apparatus 200 such as a set-top box, the display apparatus 100 may obtain information regarding the displayed content accurately.

The display system 10 will now be described according to an exemplary embodiment wherein the display apparatus 100 is a television, the broadcast receiving apparatus 200 is set-top box A, and the external server 400 transmits OSD configuration information for the set-top box A to the television.

If a user inputs a channel switch command, the set-top box A adds OSD configuration elements such as the channel number, broadcast station name, content title of the switched channel to the image of the switched channel based on the OSD configuration information for the set-top box A and transmits the image to the television.

Meanwhile, when the channel switch event occurs, the television displays the image received from the set-top box A, extracts the OSD configuration elements such as a channel number, a broadcast station name, and a content title from the displayed image, and determines whether the extracted OSD configuration elements match the OSD configuration information regarding the set-top box A, which is received from the external server 400.

In this case, the extracted OSD configuration elements were added by the set-top box A, and the OSD configuration information received from the external server 400 also corresponds to the set-top box A, so they match each other. Because they match, the display apparatus 100 may recognize the OSD configuration elements extracted from the displayed image as texts through a text recognizer, etc. and obtain information regarding the displayed image, i.e., the switched channel. The obtained information may be stored as a user's television viewing history information and may be used in various services.

Meanwhile, in the above-described case, if a user replaces set-top box A with set-top box B, the external server 400 does not recognize that the set-top box currently connected to the television 100 is the set-top box B and thus, continues to transmit OSD configuration information for the set-top box A to the television 100.

In this case, if the user inputs a channel switch command, the set-top box B adds OSD configuration element such as the channel number, broadcast station name, and content title of the switched channel in the image of the switched channel based on the OSD configuration information for the set-top box B and transmits the image to the television.

Accordingly, if a channel switch event occurs, the television displays the image received from the set-top box B, extracts an OSD configuration element from the displayed image, and determines whether the extracted OSD configuration element matches the OSD configuration information regarding the set-top box A, which is received from the external server 400.

In this case, the extracted OSD configuration element is added by the set-top box B and thus, is based on the OSD configuration information for the set-top box B, but the OSD configuration information received from the external server 400 corresponds to the set-top box A, so they do not match each other. Accordingly, the display apparatus 100 transmits the displayed image to the external server 400.

The above-described exemplary embodiment describes a case where the set-top box A is replaced with the set-top box B as the OSD configuration element extracted from the displayed image does not match the OSD configuration information received from the external server 400, but the exemplary embodiment is not limited thereto. For example, the display apparatus 100 may operate as the television in the above exemplary embodiment even in a case where software is updated from the same set-top box and thus, the existing OSD configuration information does not match the current OSD configuration information.

Meanwhile, in the exemplary embodiment of FIG. 1, the broadcast receiving apparatus 200 is realized as a set-top box, but the broadcast receiving apparatus 200 may be any apparatus capable of receiving and processing a broadcasting signal and transmitting the signal to the display apparatus 100. For example, the broadcast receiving apparatus 200 may be an external apparatus which receives a satellite broadcast signal such as a satellite broadcast receiving apparatus and transmits the signal to the display apparatus. 100.

Figure 2:
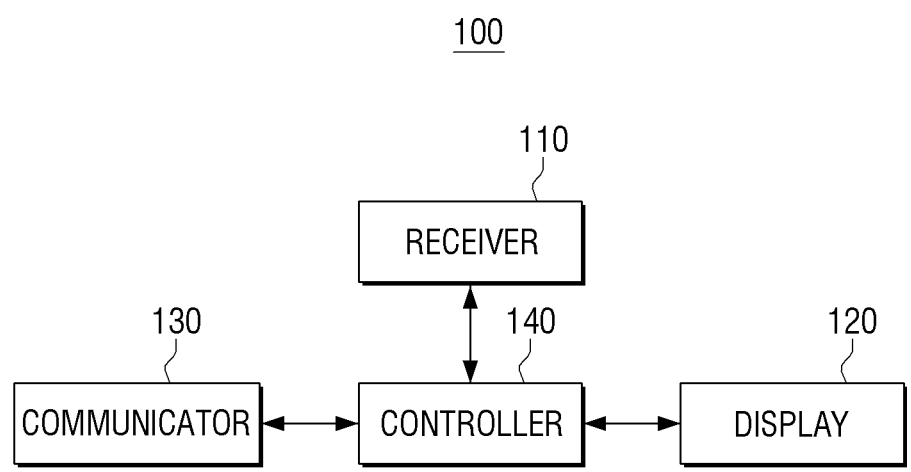
FIG. 2 is a block diagram illustrating a configuration of a display apparatus according to an exemplary embodiment.

FIG. 2 is a block diagram illustrating configuration of the display apparatus 100 according to an exemplary embodiment. As illustrated in FIG. 2, the display apparatus 100 includes a receiver 110, a display 120, a communicator 130, and a controller 140.

The receiver 110 may receive an image for which a broadcasting signal is processed from the broadcast receiving apparatus 200. In this case, if an OSD event occurs, the receiver 110 may receive an image including an OSD.

The display 120 displays an image under the control of the controller 140. In this case, the display 120 may display an image for which a broadcast signal received from the broadcast receiving apparatus 200 is processed. In particular, if an OSD event occurs, the display 120 may display an image including an OSD received from the broadcast receiving apparatus 200.

The communicator communicates with various external apparatuses. In particular, the communicator 130 communicates with the external server 400 in order to receive OSD configuration information. In addition, the communicator 130 may transmit an image displayed on the display 120 to the external server 400 under the control of the controller 140.

In this case, the OSD configuration information may include at least one of location information, color information, brightness information, size information, and spacing information of the OSD configuration element, and the OSD configuration element may include at least one of a channel number, a broadcast station name, a content title, and a current time.

The controller controls overall operations of the display apparatus 100. In particular, if an OSD event occurs, the controller 140 may extract an OSD configuration element from a displayed image, and determine whether the extracted OSD configuration element matches the OSD configuration information received from the external server 400 through the communicator 130. If it is determined that the extracted OSD configuration element matches the OSD configuration information received from the external server 400, the controller 140 may obtain information regarding the displayed image from the extracted OSD configuration element.

Specifically, if an OSD event occurs, the controller 140 may extract an OSD configuration element from the displayed image. In this case, the OSD event may be an event where an OSD is displayed on the screen of the display apparatus 100, such as a channel switch event, a scheduled viewing event, and a power on event. In this case, the controller 140 may determine whether the OSD event occurs.

For example, the controller 140 may capture an image displayed through the display 120 for a predetermined time, and extract an OSD configuration element from one area of the captured image based on received OSD configuration information. Specifically, the controller 140 may determine an area where an OSD is displayed from the captured image based on OSD location information received from the external server 400, and extract an OSD configuration element from the determined area. In this case, the controller 140 may extract a text from the determined area, and extract an OSD configuration element based on the location, size, spacing, etc. of the detected text.

If there is no OSD configuration element on the area determined based on the received OSD configuration information and thus, it is impossible to extract an OSD configuration element, the controller 140 may control the communicator 130 to transmit the captured image to the external server 400.

However, if there is an OSD configuration element on the area determined based on the received OSD configuration information and thus, an OSD configuration element is extracted, the controller 140 may determine whether the extracted OSD configuration element matches OSD configuration information received from the external server 400. Specifically, the controller 140 may detect information regarding location, color, brightness, size, and spacing of the extracted OSD configuration element which is displayed on the display 120, and compare to determine whether the detected information matches the OSD configuration information received from the external server 400.

In this case, if all of the information detected from the extracted OSD configuration element is consistent with the OSD configuration information received from the external server 400 and thus, the extracted OSD configuration element matches the received OSD configuration information, the controller 140 may recognize the extracted OSD configuration element as a text and obtain information regarding the displayed image. For example, if the extracted OSD configuration element is a channel number, a broadcast station name, and a content title, the controller 140 may recognize the element as a text and obtain information regarding the channel number, broadcast station name, and title of the content which is currently displayed.

If the information detected from the extracted OSD configuration element is not consistent with the OSD configuration information received from the external server 400 and thus, it is determined that the extracted OSD configuration element does not match the received configuration information, the controller 140 may control the communicator 130 to transmit the displayed image to the external server 400. Herein, the displayed image which is transmitted to the external server 400 may be an image which is displayed on the display apparatus 100 for a predetermined time after an OSD event occurs. For example, the displayed image which is transmitted to the external server 400 may be an image which is captured or recorded for a predetermined time after an OSD event occurs.

Meanwhile, the controller 140 may calculate recognition reliability by recognizing the OSD configuration element extracted from the displayed image as a text before determining whether the extracted OSD configuration element matches the OSD configuration information received from the external server 400, and if the calculated recognition reliability is less than a predetermined threshold value, the controller may determine that the extracted OSD configuration element does not match the received OSD configuration information.

Hereinafter, the configuration and operation of a display apparatus according to an exemplary embodiment will be described in greater detail with reference to FIGS. 3 to 6.

Figure 3:
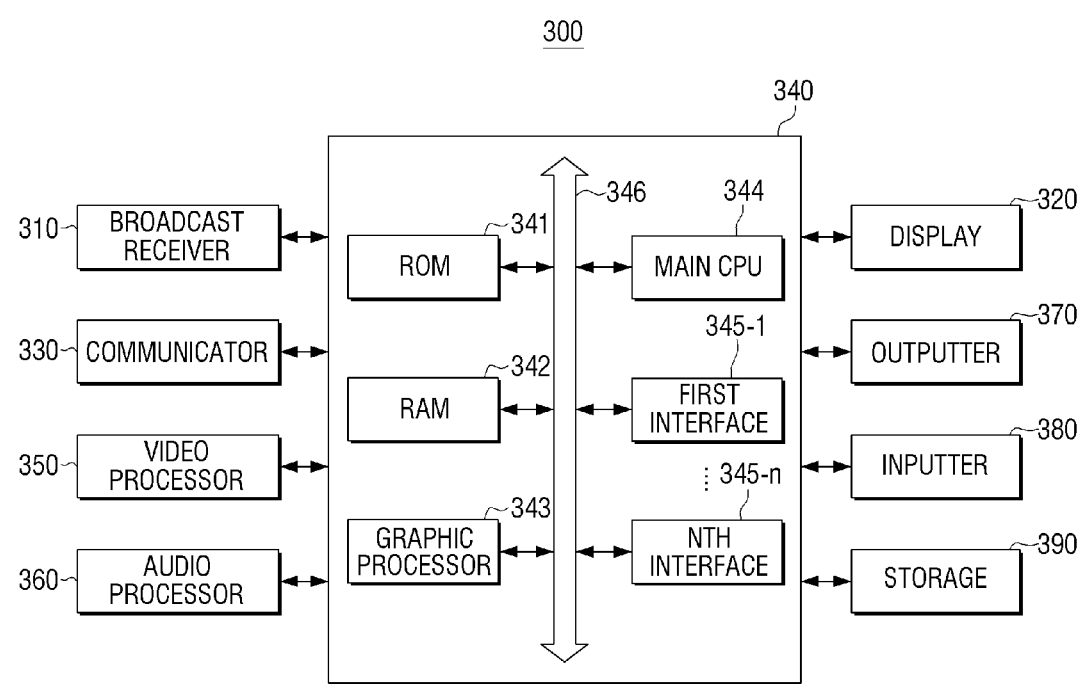
FIG. 3 is a block diagram illustrating a display apparatus in detail according to an exemplary embodiment.

FIG. 3 is a block diagram illustrating a display apparatus in greater detail according to an exemplary embodiment. According to FIG. 3, a display apparatus 300 includes a broadcast receiver 310, a display 320, a communicator 330, a controller 340, a video processor 350, an audio processor 360, an audio outputter 370, an inputter 380, and a storage 390.

The broadcast receiver 310 may receive a broadcasting signal provided from various sources. Specifically, the broadcast receiver 310 may receive a broadcasting signal transmitted directly from a broadcast station through an antenna. In addition, the broadcast receiver 310 may receive a broadcasting signal provided through the external broadcast receiving apparatus 200 such as a set-top box.

In particular, the broadcast receiver 310 may receive an image provided from the external broadcast receiving apparatus 200. In this case, additional data included the broadcasting signal may be processed in the form of OSD which is added in the image by the set-top box and received by the broadcast receiver 310.

The display 320 may display at least one of an image received through the broadcast receiver 310 and various screens generated by a graphic processor 293.

In particular, if an OSD event occurs, the display 320 may display an image including an OSD which is received from the broadcast receiving apparatus 200 through the broadcast receiver 310. In this case, the OSD displayed on the display 320 may be displayed only for a predetermined time. For example, if an OSD event is a channel switch event, the channel number, broadcast station name, content title of the switched channel may be displayed in the form of OSD only for a few seconds after the user's channel switch command is input. In this case, the predetermined time is a time where an OSD is added in the image provided to the display apparatus 300, and may be set in advance by the broadcast receiving apparatus 200.

The communicator 330 may communicate with various types of external apparatuses according to various types of communication methods. To do so, the communicator 330 may include a wired or wireless LAN card, a Bluetooth chip, a Near Field Communication (NFC) chip, or other communication methods.

In particular, the communicator 330 may communicate with the external server 400 through a network such as the Internet. Accordingly, the communicator 330 may receive OSD configuration information from the external server 400. In addition, if the OSD configuration element extracted from the image displayed on the display 320 does not match the OSD configuration information received through the external server 400, the communicator 330 may transmit the image displayed on the display 320 to the external server 400.

The video processor 350 processes image data. The video processor 350 may perform various image processing such as decoding, scaling, noise filtering, frame rate conversion, and resolution conversion, with respect to image data. The image processing may also be performed by other methods not listed here.

The audio processor 360 processes audio data. The audio processor 360 may perform various audio processing such as decoding, amplification, noise filtering, etc. with respect to audio data. The audio processing may also be performed by other methods not listed here. The audio data processed by the audio processor 360 may be output to the audio outputter 370.

Meanwhile, if a broadcast content is provided through the broadcast receiving apparatus 200 according to an exemplary embodiment, some or all of the processing by the video processor 350 or the audio processor 360 may be omitted depending on circumstances.

The audio outputter 370 outputs not only various audio data processed by the audio processor 360 but also various alarm sounds or voice messages.

The inputter 380 receives a user command to control the operation of the display apparatus 300. In this case, the inputter 380 may include not only various input apparatuses to control the display apparatus 300, such as a touch panel and a pointing device, but also a remote controller (not shown).

The storage 390 may store various operating systems (O/S) to drive the display apparatus 300, various programs and data. In particular, the storage 390 may store OSD configuration information received from the external server 400, an image displayed on the display 320 for a predetermined time after an OSD event occurs, an image which captures a displayed image for a predetermined time, and various programs to drive the display apparatus 300 as a module.

Figure 4:
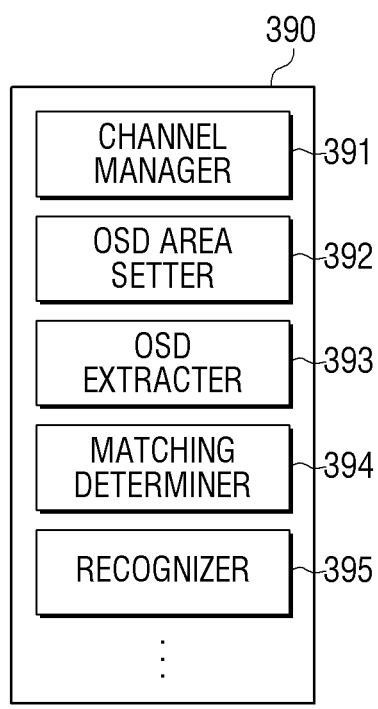
FIG. 4 is a block diagram illustrating various modules in a storage according to an exemplary embodiment.

FIG. 4 is a view illustrating program modules stored in the storage 390 according to an exemplary embodiment. According to FIG. 4, the storage 390 includes a channel manager 391, an OSD area setter 392, an OSD extracter 393, a matching determiner 394, and a recognizer 395.

The channel manager 391 may obtain information regarding a point of time when an OSD event occurs. For example, even if broadcasting is provided to the display apparatus 300 through the broadcast receiving apparatus 200, a user's channel switch command can be transmitted to the display apparatus 300, and the channel manager 391 may compare the time when a user inputs a channel switch command with the current time to figure out when a channel switch event occurs.

In addition, when a scheduled viewing time arrives, the channel manager 391 may obtain information regarding the time when a scheduled viewing event occurs by comparing the time with the current time. Further, the channel manager 391 may obtain information regarding the time when a power on event occurs by comparing the time when the power of the display apparatus 300 is turned on with the current time.

Meanwhile, the channel manager 391 may recognize a channel switch time by analyzing the image displayed on the display 320 without using a channel switch command. For example, the channel manager 391 may obtain information regarding the time when the channel switch event occurs by using the feature of displaying a black screen for a while when a channel is switched.

Using the above-described methods, the channel manager 391 may obtain information regarding the time when an OSD event occurs.

The OSD area setter 392 sets an area where an OSD configuration element is to be extracted based on OSD configuration information received from the external server 400 through the communicator 330. Specifically, the OSD area setter 392 may set an OSD extracting area where an OSD configuration element is to be extracted from the displayed image based on location information regarding where an OSD included in the OSD configuration information received from the external server 400 is displayed.

The OSD extracter 393 extracts an OSD configuration element from an area set by the OSD area setter 392. Specifically, the OSD extracter 393 may detect a text from the OSD extracting area. That is, as the broadcast receiving apparatus 200 adds an OSD configuration element in an image and transmits the image to the display apparatus 300, not only the OSD configuration element but also the image can be overlapped in the OSD extracting area, and in this case, the OSD extracter 393 may detect a text. Herein, the OSD extracter 393 may detect a text from the OSD extracting area using a conventional text detecting method. For example, the OSD extracter 393 may detect a text by analyzing the color or a border area of the image in the OSD extracting area.

In addition, the OSD extracter 393 may extract an OSD configuration element by separating an OSD configuration element from a text which is detected based on location, size, spacing, and other attributes, of detected texts.

The matching determiner 394 may determine whether the OSD configuration element extracted through an OSD extracter matches the OSD configuration information received from the external server 400. Specifically, the matching determiner 394 may obtain OSD configuration information including information regarding at least one of location, color, brightness, size, and spacing of each OSD configuration element from the OSD configuration element extracted through the OSD extracter 393. In addition, the matching determiner 394 may determine whether the OSD configuration information of the extracted OSD configuration element is consistent with the OSD configuration information received from the external server 400. Accordingly, if the OSD configuration information of the extracted OSD configuration element is consistent with the received OSD configuration information, the matching determiner 394 may determine that the extracted OSD configuration element matches the received OSD configuration information, and if the OSD configuration information of the extracted OSD configuration element is not consistent with the received OSD configuration information, the matching determiner 394 may determine that the extracted OSD configuration element does not match the received OSD configuration information.

Meanwhile, if there are a plurality of OSD configuration elements extracted from the displayed image, the matching determiner 394 may compare each of the OSD configuration elements with the received OSD configuration information to determine whether they match each other. In this case, if each of the plurality of extracted OSD configuration elements matches the received OSD configuration information, the matching determiner 394 determines that they match each other, but if at least one of the plurality of extracted OSD configuration elements is not consistent with the received OSD configuration information, the matching determiner 394 may determine that they do not match each other. However, this is only an example, and an exemplary embodiment is not limited thereto.

In addition, the matching determiner 394 may determine whether the extracted OSD configuration element matches the received OSD configuration information through recognition reliability calculated by the recognizer 395 when the OSD configuration element extracted through the OSD extracter 394 is recognized as a text through the recognizer 395. Specifically, if the recognition reliability regarding the extracted OSD configuration element, which is calculated by the recognizer 394, is less than a predetermined threshold value, the matching determiner 394 may determine that the extracted OSD configuration element does not match the received OSD configuration information.

In addition, if there is no text in the OSD extracting area which is set through the OSD area setter 392 and thus, it is impossible for the OSD extracter 393 to extract a text, the matching determiner 394 may determine that the extracted OSD configuration element does not match the received OSD configuration information.

The recognizer 395 may recognize an input image as a letter. For example, the recognizer 395 may use an Optical Character Recognition (OCR) method, but this is only an example. Specifically, if the matching determiner 394 determines that the extracted OSD configuration element matches the received OSD configuration information, the recognizer 395 may recognize the extracted OSD configuration element as a character.

Herein, the OSD configuration element before it is recognized as a character by the recognizer 395 is an OSD configuration element included in the image provided by the broadcast receiving apparatus 200 as an OSD event occurs, and is extracted by the OSD extracter 393 on the OSD extracting area which is set by the OSD area setter 392, which is part of the displayed image, and the display apparatus 300 may not recognize the OSD configuration element as information.

Subsequently, the OSD configuration element which is extracted from the displayed image is recognized as a character only after it is processed through the recognizer 395, and information regarding the displayed image can be obtained based on the character.

Meanwhile, such a recognized character includes at least one of a channel number, a broadcast station name, a content title, and a current time, and through such information, the display apparatus 300 may obtain information regarding the channel number, broadcast station name, content title, and current time of the displayed image according to an OSD event.

Meanwhile, the recognizer 395 may calculate recognition reliability when the OSD configuration element extracted from the displayed image is recognized as a character. The recognition reliability may be calculated using a known method, and the specific method thereof will not be provided since it is not the point of an exemplary embodiment.

The controller 340 controls overall operations of the display apparatus 300. As illustrated in FIG. 3, the controller 340 includes a ROM 341, a RAM 342, a graphic processor 343, a main CPU 344, a first to nth interfaces 345-1 to 345-n, and a bus 346. In this case, the ROM 341, the RAM 342, the graphic processor 343, the main CPU 344, and the first to nth interfaces 345-1-345-n may be connected to each other through the bus 346.

The ROM 341 stores a set of commands for system booting. If a turn-on command is input and power is supplied, the main CPU 344 copies an O/S stored in the storage 390 onto the RAM 342 according to a command stored in the ROM 341 and boots a system by executing the O/S. If the booting is completed, the main CPU 344 copies various application programs stored in the storage 390 onto the RAM 342 and performs the various operations by executing the application programs copied in the RAM 342.

The graphic processor 343 generates a screen including various objects such as an icon, an image, and a text using a computer (not shown) and a renderer (not shown). The computer computes property values such as coordinates, shape, size, and color of each object to be displayed according to the layout of the screen using a control command received from the inputter 380. The renderer generates a screen with various layouts including objects based on the property values computed by the computer. The screen generated by the renderer is displayed within the display area of the display 320.

The main CPU 344 access the storage 390, and performs booting using an O/S stored in the storage 390, and performs various operations using various programs, contents, and data stored in the storage 390.

The first to nth interfaces 345-1 to 345-n are connected to the above-described various components. One of the interfaces may be a network interface which is connected to an external apparatus via network.

Hereinafter, the operation of the controller 340 may be described in greater detail with reference to FIGS. 5 and 6.

Figure 5:
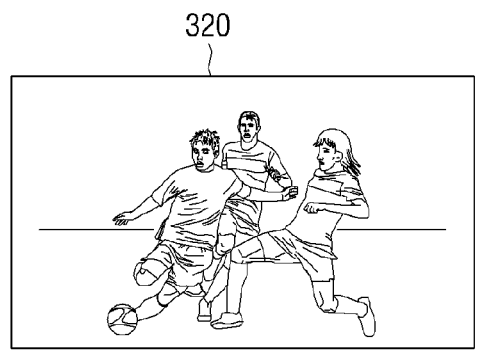
FIG. 5 illustrates a case where a received OSD configuration information matches an extracted OSD configuration element.
Figure 5:
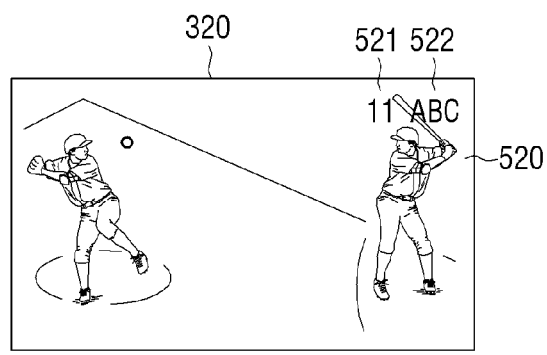
Figure 5:
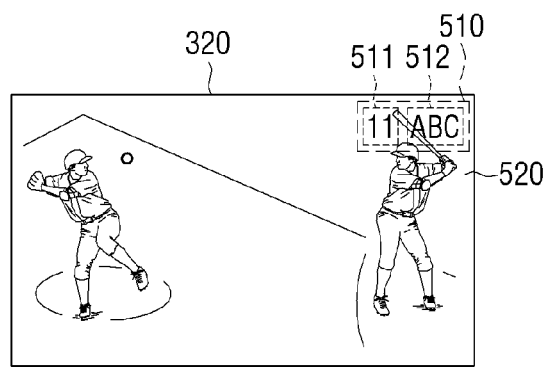
Figure 6:
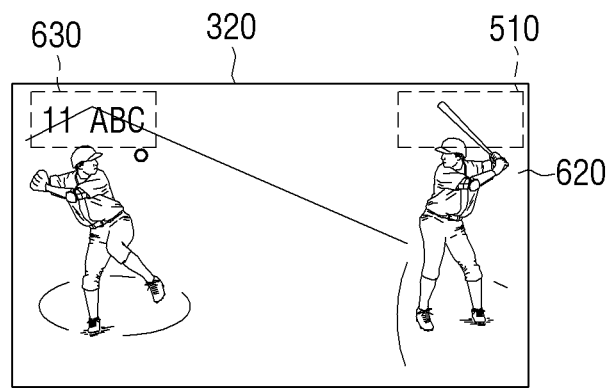
FIG. 6 illustrates a case where a received OSD configuration information does not match an extracted OSD configuration element.
Figure 6:
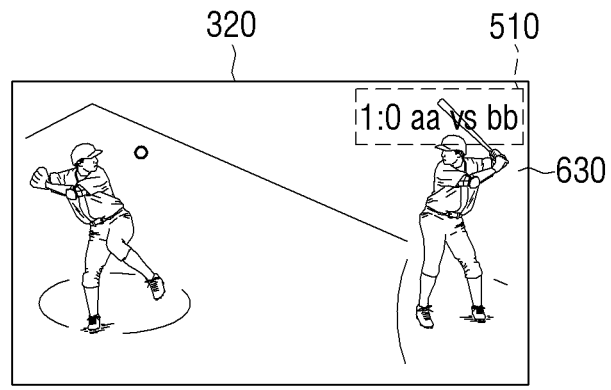

FIG. 5 illustrates a case where according to the occurrence of an OSD display event, the OSD configuration element extracted from the image displayed on the display 320 matches the OSD configuration information received from the external server 400 through the communicator 330, and FIG. 6 illustrates a case where they do not match each other.

FIG. 5(*a*) illustrates that a certain content is displayed on the display 320 before an OSD event occurs and FIG. 5(*b*) illustrates that when a channel switch event occurs, an image 520 of the switched channel and information regarding a channel number 521 and a broadcast station name 522 of the switched channel are displayed on one area of the image 520 in the form of OSD. In addition, FIG. 5(*b*) may represent a screen where the switched channel image is captured. FIG. 5(*c*) illustrates an example where an OSD extracting area 510 is set using the OSD configuration information received from the external server 400. FIG. 5(*d*) illustrates an example where an OSD configuration element is extracted from the OSD extracting area.

When an OSD event occurs, the controller 340 may recognize the point of time when the OSD event occurs.

If an OSD event is a user's channel switch event and a user inputs a channel switch command through a remote controller, the display apparatus 300 may receive the user's channel switch signal. For example, if a user uses a television by connecting it to a set-top box, and the user inputs a channel switch command using a TV remote controller, a channel switch signal of the TV remote controller is transmitted to the set-top box through an apparatus such as an IR blaster, and the set-top box may add an OSD configuration element in the image of the switched channel and provide the image to the television. In this case, the apparatus such as an IR blaster can be attached to the television and accordingly, the television may also receive the user's channel switch signal. Thus, when a channel switch event occurs, the display apparatus 300 may recognize when the event occurs.

In addition, the controller 340 may also recognize when a switched viewing event or a power on event occurs.

Meanwhile, the controller 340 may recognize when a channel is switched by analyzing a received image without receiving a user's channel switch signal. For example, the controller 340 may recognize the time when a channel is switched by using the feature of displaying a black screen for a while before and after the channel conversion.

In this case, the controller 340 may obtain information regarding the point of time when the OSD event occurs using the channel manager 391 stored in the storage 390.

Accordingly, the controller 340 may obtain information regarding the time when the channel in FIG. 5(*a*) is switched to the channel in FIG. 5(*b*) according to a channel switch event.

Meanwhile, if an OSD event occurs, the controller 340 may capture a displayed image for a predetermined time since an OSD which is displayed along with the image after the OSD event occurs disappears after a predetermined time elapses. In addition, the controller 340 may capture an image at predetermined intervals after an OSD event occurs and the intervals can be set in advance. For example, after an OSD event occurs, the interval of capturing a displayed image may be 60 frames per second, but is not limited thereto. FIG. 5(*b*) illustrates a screen captured where an image after a channel is switched according to a channel switch event.

Further, the controller 340 may set an OSD extracting area on the captured image. Herein, the OSD extracting area is set based on the OSD configuration information received from the external server 400 through the communicator 330. For example, the OSD extracting area may be set based on location information of OSD configuration elements out of the received OSD configuration information.

FIG. 5(*c*) illustrates a case where the OSD configuration information received from the external server 400 includes that a channel number is displayed on the location of reference numeral 511 in a certain size and that a broadcast station name is displayed on the location of reference numeral 512 in a certain size. Accordingly, the controller 340 may set the area of reference numerals 511 and 512 as the OSD extracting area. In addition, the controller 340 may set the area of reference numeral 510 which includes the area of reference numerals 511 and 512 as the OSD extracting area. In this case, the controller 340 may set the OSD extracting area using the OSD area setter 392 stored in the storage 390. Hereinafter, an example case where the area such as the area of reference number 510 as described above is set as the OSD extracting area will be described.

The controller 340 may also extract an OSD configuration element from the OSD extracting area. In this case, the controller 340 may utilize the OSD extracter 393 stored in the storage 390. Accordingly, the controller 340 may detect a text from the OSD extracting area 510, and extract an OSD configuration element based on the location, size, and spacing of the detected text. In the example of FIG. 5(*c*), the controller 340 may detect a text such as "ABC" from the OSD extracting area 510, and extract an OSD configuration element such as "11" (521) and "ABC" (522) based on the location, size, and spacing of the detected text.

FIG. 5(*d*) illustrates that the controller 340 detects a text from the OSD extracting area 510 and extracts an OSD configuration element from the detected text.

In addition, the controller 340 may determine whether the extracted OSD configuration element matches the OSD configuration information received from the external server 400. In this case, the controller 340 may utilize the matching determiner 394 stored in the storage 390.

Specifically, the controller 340 may obtain OSD configuration information from the extracted OSD configuration elements 521, 522. In FIG. 5(*d*), extracted OSD configuration elements are 11 (521) and ABC (522). Accordingly, the controller 340 may obtain OSD configuration information such as the location, color, brightness, size, and spacing of the extracted 11 (521) and ABC (522) which are displayed on the display 320, respectively, from the captured image 520. For example, the controller 340 may obtain information that 11 (521) is displayed on the location of reference numeral 511 and ABC (522) is displayed on the location of reference numeral 512 and information regarding color, brightness, size, and spacing of each of 11 (521) and ABC (522).

Accordingly, the controller 340 may determine whether the OSD configuration information obtained from the extracted OSD configuration elements 521, 522 matches the OSD configuration information received from the external server 400 through the communicator 330.

FIG. 5 illustrates a case where broadcast receiving apparatus A provides an image including an OSD to the display apparatus 300 based on OSD configuration information for the broadcast receiving apparatus A, and the external server 400 also provides OSD configuration information for the broadcast receiving apparatus A to the display apparatus 300, and as the controller 340 extracts an OSD configuration element from an image captured based on the OSD configuration information received from the external server 400, the OSD configuration information obtained from the extracted OSD configuration element matches the OSD configuration information received from the external server 400. Accordingly, the controller 340 determines that the extracted OSD configuration element matches the received OSD configuration information.

In addition, if it is determined that the extracted OSD configuration element matches the received OSD configuration information, the controller 340 recognizes the extracted OSD configuration information as a character and obtains information regarding a displayed image, i.e., an image which is switched according to the channel conversion. In this case, the controller 340 may utilize the recognizer 395 stored in the storage 390.

That is, as the extracted OSD configuration element is only part of the image, the meaning of the element cannot be known until it is recognized as a character, and the meaning cannot be obtained until the controller 340 recognizes the extracted OSD configuration element as a character.

In FIG. 5(*d*), as it is determined that 11 (521) and ABC (522) match the OSD configuration information received from the external server 400, the controller 340 may obtain information that the image displayed on the display 320 according to a channel switch event is channel 11, which is broadcast by an ABC broadcast station by recognizing 11 (521) and ABC (522) as a character.

Meanwhile, in the example of FIG. 5, only the channel number and the broadcast station name are displayed as an OSD configuration element, but a content title or a current time may be further included in the OSD configuration element and thus, they may be displayed depending on exemplary embodiments. In this case, the content title regarding the displayed image and the time when the channel is switched may also be obtained as information.

The obtained information may be stored as the broadcast viewing history of a user of the display apparatus 300 and may be used for various services that are based on information regarding a viewing history.

FIG. 6 illustrates the operation of the controller 340 when the OSD configuration element extracted from an image displayed on the display 320 does not match the OSD configuration information received from the external server 400 through the communicator 330 according to the occurrence of an OSD event.

In FIG. 6, the broadcast receiving apparatus 200 is replaced and OSD configuration information is received from the external server 400 as in FIG. 5, but the OSD included in the image provided from the broadcast receiving apparatus 200 according to the occurrence of an OSD event is different from that of FIG. 5.

Specifically, in FIG. 6(*a*), an image 620 including an OSD configuration element is displayed after a channel switch event occurs on the screen of FIG. 5(*a*), but unlike in the case of FIG. 5(*b*), an OSD including a channel number and a broadcast station name is displayed on the location of reference numeral of 630.

That is, the OSD configuration information received from the external server 400 is the same as that of FIG. 5 and thus, when a channel switch event occurs, the controller 340 may capture the image 620 displayed on the display 320 for a predetermined time, and set the location and the area of the reference numeral 510 on the captured image as an OSD extracting area. Subsequently, the controller 340 should detect a text from the set OSD extracting area 510, but there is no text in the OSD extracting area 510 in the example of FIG. 6(*a*). As no text is detected, the controller 340 may not extract an OSD configuration element.

In this case, the controller 340 may control the communicator 330 to transmit the captured image 620 of FIG. 6(*a*) to the external server 400.

Accordingly, the external server 400 may update the OSD configuration information based on the received image. Specifically, as the OSD configuration element is displayed on the location and area of reference numeral 630 not 510 in FIG. 6(*a*), the external server 400 may select OSD configuration information for a broadcast receiving apparatus where an OSD configuration element such as the received image 620 can be displayed in the area 630 from the pre-stored broadcast receiving apparatus and the corresponding OSD configuration information list, and update the OSD configuration information to be transmitted to the display apparatus 300 to the selected OSD configuration information. Meanwhile, depending on exemplary embodiments, OSD configuration information may be obtained by extracting an OSD configuration element at the location and area of reference numeral 630 directly from the received image 620, and the OSD configuration information to be transmitted to the display apparatus 300 may be updated to the obtained OSD configuration information.

Meanwhile, in FIG. 6(*b*) illustrates a case where the controller 340 captures the image 630 which is displayed for a predetermined time according to the occurrence of a channel switch event, but the display time of an OSD has elapsed and thus, the OSD is not displayed and another text is detected accidently in the OSD extracting area 510.

In this case, the controller 340 may detect a text from the OSD extracting area 510, and separate an OSD configuration element from the detected text. In FIG. 6(*b*), the controller 340 detects a text of "aa vs bb." In addition, the controller 340 may detect OSD configuration elements of "1:0 (541)" and "aa vs bb (542)" based on the location, size, spacing, etc. of the detected text. In FIG. 6(*c*), the controller detects a text from the OSD extracting area, and extracts an OSD configuration element from the detected text.

Subsequently, the controller 340 may obtain OSD configuration information from the extracted OSD configuration elements 541, 542. That is, the controller 340 may obtain OSD configuration information such as the location, color, brightness, size, and spacing of the extracted "1:0 (541)" and "aa vs bb (542)" which are displayed on the display 320, respectively, from the captured image 630.

The controller 340 compares the obtained OSD configuration information with the OSD configuration information received from the external server 400, and determines whether the extracted OSD configuration element matches the received OSD configuration information. However, in the case of FIG. 6(*c*), the information regarding the location, color, brightness, size, spacing, etc. of the OSD configuration elements 541, 542 extracted from the captured image 630 is not consistent with the information regarding the location, color, brightness, size, spacing, etc. of the OSD configuration elements received from the external server 400 and thus, the controller 340 determines that the extracted OSD configuration element does not match the received OSD configuration information. Accordingly, even if an OSD configuration element is extracted from the captured image, the controller 340 does not recognize the element as a character.

Meanwhile, even in this case, the controller 340 may control the communicator 330 to transmit the captured image 630 to the external server 400. However, in the case of FIG. 6(*c*), OSD configuration elements such as a channel number and a broadcast station name do not appear on the captured image 630 and thus, the external server 400 does not update the OSD configuration information based on the received image 630.

The case illustrated in FIG. 6(*c*) may occur since the time when a broadcast receiving apparatus adds an OSD in an image according to the occurrence of an OSD event is different from a predetermined time when the display apparatus 300 captures an image according to the occurrence of an OSD event, and thus, as described above, there is an image including an OSD configuration element from among a plurality of images which are captured at predetermined intervals after the occurrence of an OSD event, which may be used to update the OSD configuration information.

Meanwhile, according to another exemplary embodiment, the controller 340 may recognize the extracted OSD configuration element as a character before determining whether the OSD configuration element extracted from the image displayed on the display 320 matches the OSD configuration information received from the external server 400. In this case, the controller 340 may utilize the recognizer 395 stored in the storage 390. Accordingly, if the recognition reliability calculated through the recognizer 394 is less than a predetermined threshold value, the controller 340 may determine that the extracted OSD configuration element does not match the received OSD configuration information.

Meanwhile, in the examples of FIGS. 5 and 6, an OSD event is a channel switch event, but it is not limited thereto. The display apparatus 300 may operate in the same manner when the OSD event is a scheduled viewing event or a power event.

Meanwhile, in the example of FIG. 6, if the extracted OSD configuration element does not match the received OSD configuration information in the captured image, the captured image is transmitted to the external server 400. However, if it is determined that they do not match each other after determining whether to match or not for a predetermined times, all of the captured images may be transmitted to the external server 400, or a video which is recorded until a predetermined time after an OSD event occurs may be transmitted to the external server 400.

Meanwhile, in the above exemplary embodiment, a channel switch event is performed through a user's manipulation on a remote controller, but this is only an example. Depending on exemplary embodiments, the display apparatus 300 may include a camera (not shown) and an operation recognizer (not shown), and a channel switch event may occur through a user motion. The display apparatus 300 may also have a microphone (not shown) and a voice recognizer (not shown), and a channel switch event may occur through a voice.

Figure 7:
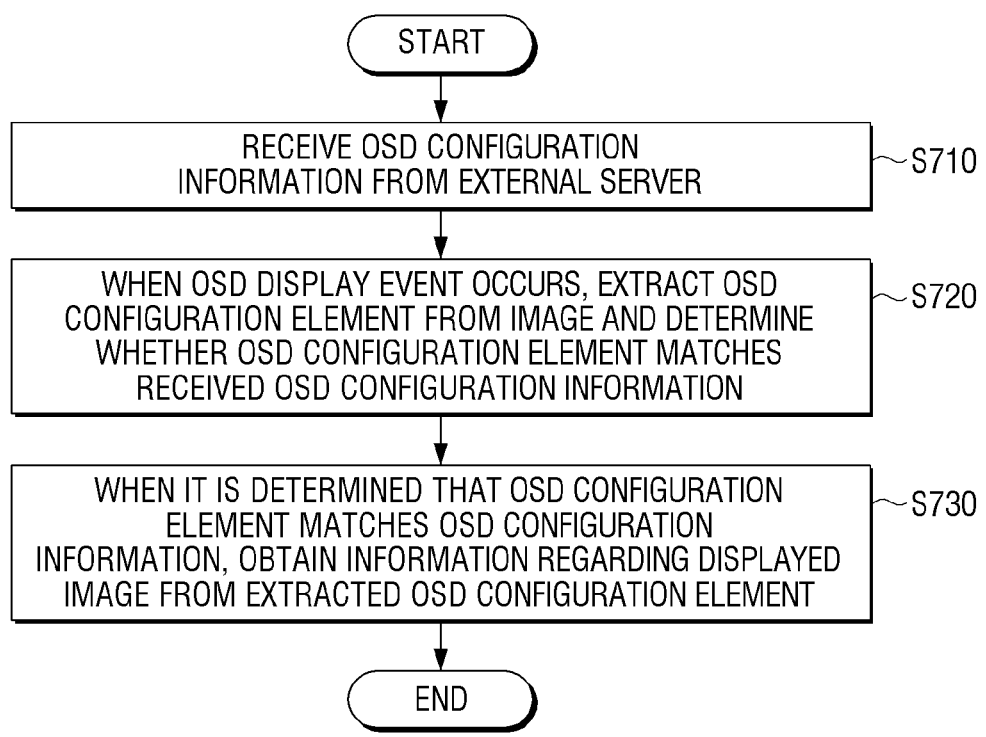
FIG. 7 is a flowchart illustrating a method of controlling a display apparatus according to an exemplary embodiment.

FIG. 7 is a flowchart illustrating a method of controlling a display apparatus according to an exemplary embodiment. According to FIG. 7, the receiver 110 of the display apparatus 100 receives OSD configuration information from the external server 400 (S710). Herein, the OSD configuration information refers to information regarding the location, color, brightness, size, spacing, etc. of the OSD configuration element such as a channel number, a broadcast station name, a content title, and a current time which is displayed on the display 120. Meanwhile, the OSD configuration information corresponds to the broadcast receiving apparatus 20 which provides an image displayed on the display apparatus 100.

Subsequently, if an OSD event occurs, the controller 140 extracts an OSD configuration element from the image displayed on the display 120, and determines whether the OSD configuration element matches the OSD configuration information received from the external server 400 (S720). Herein, the OSD event may be a channel switch event to change a channel which is currently watched by a user, a scheduled viewing event to change a channel which is currently watched by a user when a scheduled viewing time arrives, and a power on event to turn on the power of a display apparatus, and the OSD event means displaying an image where an OSD is added on the display 120.

Specifically, if an OSD event occurs, the controller 140 may capture an image displayed on the display 120 for a predetermined time, extract an OSD configuration element from one area of the captured image based on OSD configuration information received from the external server 400, and determine whether the extracted OSD configuration element matches the received OSD configuration information. In this case, if there are a plurality of OSDs in the image displayed on the display 120, the controller 140 may determine whether the plurality of OSD configuration elements match the received OSD configuration information.

In addition, the controller 140 recognizes the extracted OSD configuration element as a character, calculates recognition reliability, and if the calculated recognition reliability is less than a predetermined threshold value, determines that the extracted OSD configuration element does not match the received OSD configuration information.

Subsequently, if it is determined that the OSD configuration element extracted from the image matches the OSD configuration information received from the external server 400, the controller 140 obtains information regarding the displayed image from the extracted OSD configuration element (S730). For example, the controller 140 may recognize the extracted OSD configuration element as a character and obtain information regarding the displayed image, such as a channel number, a broadcast station name, a content title, and a current time.

Meanwhile, if there is no OSD configuration element in the area of the displayed image, which is set based on the received OSD configuration information, or if it is determined that the extracted OSD configuration element does not match the received OSD configuration information, the controller 140 may transmit the displayed image to the external server 400. The external server 400 may update the OSD configuration information using the received image.

FIG. 8 is a flowchart provided to explain a method of controlling a display apparatus according to another exemplary embodiment. According to FIG. 8, the display apparatus 100 obtains OSD configuration information from the external server 400 through the receiver 110 (S810). Subsequently, if an OSD event occurs, the controller 140 extracts an OSD configuration element from one area of the displayed image based on the OSD configuration information received from the external server 400 (S820).

In this case, if an OSD configuration element is extracted (S820, Y), the controller 140 determines whether the extracted OSD configuration element matches the OSD configuration information received from the external server 400 (S830). Herein, if the extracted OSD configuration element matches the received OSD configuration information (S830, Y), the controller 140 obtains information regarding the image displayed on the display 120 from the extracted OSD configuration element (S840).

If no OSD configuration element is extracted (S820, N), or if it is determined that the extracted OSD configuration information does not match the received OSD configuration information (S830, N), the controller 140 controls the communicator 130 to transmit the displayed image to the external server 400 (S850).

According to the above-described various exemplary embodiments, even if a content is received and displayed through an external broadcast receiving apparatus such as a set-top box, a display apparatus may obtain information regarding the displayed content, and provide various services using the obtained information.

Meanwhile, the method of controlling a display apparatus according to the above-described various exemplary embodiments may be realized as a program code, stored in a non-transitory readable medium, and provided therein. The display apparatus equipped with such a non-transitory readable medium may execute the program code and perform the method of controlling the display apparatus according to the above-described various exemplary embodiments.

For example, the non-transitory readable medium may store and provide a program code to perform the method of controlling a display apparatus including receiving OSD configuration information from an external server, when an OSD event occurs, extracting an OSD configuration element from a displayed image, determining whether the extracted OSD configuration element matches the received OSD configuration information, and if it is determined that the extracted OSD configuration element matches the received OSD configuration information, obtaining information regarding the displayed image from the extracted OSD configuration element.

Herein, the non-transitory recordable medium refers to a medium which may store data semi-permanently rather than storing data for a short time such as a register, a cache, and a memory and may be readable by an apparatus. Specifically, the non-transitory recordable medium may be CD, DVD, hard disk, Blu-ray disk, USB, memory card, ROM, etc.

The foregoing embodiments and advantages are merely exemplary and are not to be construed as limiting any aspects of the disclosure. The present disclosure can be readily applied to other types of apparatuses and methods. Also, the description of the exemplary embodiments of the present inventive concept is intended to be illustrative, and not to limit the scope of the claims, and many alternatives, modifications, and variations will be apparent to those skilled in the art.

What is claimed is:

1. A display apparatus, comprising:
    a receiver that receives an image;
    a display that displays the image;
    a communicator that communicates with an external server and receives On-Screen Display (OSD) configuration information; and
    a controller that, when an OSD event occurs, extracts an OSD configuration element from the displayed image, and in response to determining that the extracted OSD configuration element matches the received OSD configuration information, obtains information regarding the displayed image from the extracted OSD configuration element.

2. The display apparatus as claimed in claim 1, wherein the OSD configuration information includes at least one of location information, color information, brightness information, size information, and spacing information of the OSD configuration element,
    wherein the OSD configuration element includes at least one of a channel number, a broadcast station name, a content title, and a current time.

3. The display apparatus as claimed in claim 1, wherein the controller, when an OSD event occurs, captures the displayed image for a predetermined time, and extracts the OSD configuration element from one area of the captured image based on the received OSD configuration information.

4. The display apparatus as claimed in claim 1, wherein the controller, when it is determined that the OSD configuration element does not exist in one area of the displayed image which is set based on the received OSD configuration information, or the extracted OSD configuration element does not match the received OSD configuration information, controls the communicator to transmit the displayed image to the external server.

5. The display apparatus as claimed in claim 1, wherein the controller recognizes the extracted OSD configuration element as a letter, calculates a degree of recognition reliability, and in response to the calculated degree of recognition reliability being less than a predetermined threshold value, determines that the extracted OSD configuration element does not match the received OSD configuration information.

6. The display apparatus as claimed in claim 2, wherein the OSD configuration information corresponds to a broadcast receiving apparatus which provides an image displayed on the display apparatus.

7. The display apparatus as claimed in claim 3, wherein the controller, when there are a plurality of OSD configuration elements in the displayed image, determines whether the plurality of OSD configuration elements match the received OSD configuration information.

8. A method of controlling a display apparatus, comprising:
    receiving On-Screen Display (OSD) configuration information from an external server;
    when an OSD event occurs, extracting an OSD configuration element from the displayed image; and
    in response to determining that the extracted OSD configuration element matches the received OSD configuration information, obtaining information regarding the displayed image from the extracted OSD configuration element.

9. The method as claimed claim 8, wherein the OSD configuration information includes at least one of location information, color information, brightness information, size information, and spacing information of the OSD configuration element,
    wherein the OSD configuration element includes at least one of a channel number, a broadcast station name, a content title, and a current time.

10. The method as claimed in claim 8, wherein the determining comprises, when an OSD event occurs, capturing the displayed image for a predetermined time; and
    extracting the OSD configuration element from one area of the captured image based on the received OSD configuration information, and determining whether the extracted OSD configuration element matches the received OSD configuration information.

11. The method as claimed in claim 8, further comprising:
    when it is determined that the OSD configuration element does not exist in one area of the displayed image which is set based on the received OSD configuration information, or the extracted OSD configuration element does not match the received OSD configuration information, transmitting the displayed image to the external server.

12. The method as claimed in claim 8, wherein the determining comprises:
    recognizing the extracted OSD configuration element as a character and calculating a degree of recognition reliability,
    wherein in response to the calculated degree of recognition reliability being less than a predetermined threshold value, it is determined that the extracted OSD configuration element does not match the received OSD configuration information.

13. The method as claimed in claim 9, wherein the OSD configuration information corresponds to a broadcast receiving apparatus which provides an image displayed on the display apparatus.

14. The method as claimed in 10, wherein the determining comprises, when there are a plurality of OSD configuration elements in the displayed image, determining whether the plurality of OSD configuration elements match the received OSD configuration information.

15. A display system comprising:
    a broadcast receiving apparatus transmitting an image and an On-Screen Display (OSD) including at least one of a channel number, a broadcast station name, and a content title to display apparatus;
    an external server that transmits OSD configuration information for a broadcast receiving apparatus, and in response to an image being received from the display apparatus, updates the OSD configuration information using the received image; and
    a display apparatus that, when an OSD event occurs, extracts an OSD configuration element from a displayed image; and
    in response to determining that the extracted OSD configuration element matches the received OSD configuration information, obtains information regarding the displayed image from the extracted OSD configuration element; and
    in response to determining that the extracted OSD configuration element does not match the received OSD configuration information, transmits the displayed image to the external server.

* * * * *